(12) United States Patent
Ou et al.

(10) Patent No.: US 8,195,441 B1
(45) Date of Patent: Jun. 5, 2012

(54) HARDWARE CO-SIMULATION INVOLVING A PROCESSOR DISPOSED ON A PROGRAMMABLE INTEGRATED CIRCUIT

(75) Inventors: Jingzhao Ou, San Jose, CA (US); Chi Bun Chan, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 424 days.

(21) Appl. No.: 12/582,564

(22) Filed: Oct. 20, 2009

(51) Int. Cl.
*G06F 17/50* (2006.01)
(52) U.S. Cl. ............................ 703/14; 716/106; 716/117
(58) Field of Classification Search ................ 703/13, 703/14; 716/106, 116, 117
See application file for complete search history.

(56) References Cited

U.S. PATENT DOCUMENTS

| | | | | |
|---|---|---|---|---|
| 7,437,280 | B1* | 10/2008 | Ballagh et al. ................ | 703/14 |
| 7,636,653 | B1* | 12/2009 | Chan et al. .................... | 703/14 |
| 7,707,019 | B1* | 4/2010 | Ballagh et al. ................ | 703/13 |
| 7,739,092 | B1* | 6/2010 | Ballagh et al. ................ | 703/13 |
| 7,746,099 | B1* | 6/2010 | Chan et al. .................... | 326/38 |
| 7,747,423 | B1* | 6/2010 | Shirazi et al. ................. | 703/13 |
| 7,930,162 | B1* | 4/2011 | Chan et al. .................... | 703/14 |
| 8,041,553 | B1* | 10/2011 | Hernandez et al. ............ | 703/14 |
| 8,082,139 | B1* | 12/2011 | Ballagh et al. ................ | 703/14 |
| 8,102,188 | B1* | 1/2012 | Chan et al. .................... | 326/38 |
| 2008/0235415 | A1* | 9/2008 | Clark et al. ................... | 710/105 |

OTHER PUBLICATIONS

XILINX, Inc., *System Generator for DSP*, Rel. 10.1, Mar. 2008, pp. 175-182, Xilinx, Inc., San Jose, California, USA.
XILINX, Inc., *PLBv46 to PLBv46 Bridge* (v1.01a), DS618, Apr. 21, 2008, pp. 1-21, Xilinx, Inc., San Jose, California, USA.

* cited by examiner

*Primary Examiner* — Russell Frejd
(74) *Attorney, Agent, or Firm* — Kevin T. Cuenot; Lois D. Cartier

(57) ABSTRACT

A system can include a bus proxy comprising a primary slave coupled to a processor via a bus. The bus proxy system can include a hardware co-simulation interface disposed within the programmable IC and coupled to the bus proxy. The hardware co-simulation interface can buffer simulation data from the bus proxy and the host processing system. The bus proxy can include a secondary slave executing with a host processing system that reads data from, and writes data to, the hardware co-simulation interface, and communicates with at least one high level modeling system (HLMS) block executing within the host processing system. The primary slave can exert a slave wait signal on the bus responsive to detecting a bus request from the processor specifying an address corresponding to the HLMS block within the host processing system.

20 Claims, 6 Drawing Sheets

HARDWARE CO-SIMULATION INVOLVING A PROCESSOR DISPOSED ON A PROGRAMMABLE INTEGRATED CIRCUIT

FIELD OF THE INVENTION

The embodiments disclosed within this specification relate to integrated circuit devices (ICs). More particularly, the embodiments relate to hardware co-simulation between a host processing system and an IC comprising a processor.

BACKGROUND

Programmable integrated circuit devices (ICs) are a well-known type of IC that can be programmed to perform specified logic functions. One type of programmable IC, the field programmable gate array (FPGA), typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect and programmable circuitry. The programmable interconnect typically includes a large number of interconnect lines of varying lengths interconnected by programmable interconnect points (PIPs). The programmable circuitry implements the logic of a user design using programmable elements that can include, for example, function generators, registers, arithmetic logic, and so forth.

The programmable interconnect and programmable circuitry are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of programmable IC is the complex programmable logic device, or CPLD. A CPLD includes two or more "function blocks" connected together and to input/output (I/O) resources by an interconnect switch matrix. Each function block of the CPLD includes a two-level AND/OR structure similar to those used in programmable logic arrays (PLAs) and programmable array logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable ICs, the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other programmable ICs are programmed by applying a processing layer, such as a metal layer, that programmably interconnects the various elements on the device. These programmable ICs are known as mask programmable devices. Programmable ICs can also be implemented in other ways, e.g., using fuse or antifuse technology. The phrase "programmable IC" can include, but is not limited to, the devices described herein and further can encompass devices that are only partially programmable. For example, one type of programmable IC includes a combination of hard-coded transistor circuitry and a programmable switch fabric that programmably interconnects the hard-coded transistor circuitry.

Hardware co-simulation refers to a process in which a portion of an electronic circuit is simulated within software executing in a host computing system and another portion of the electronic circuit is implemented using actual circuitry or hardware, e.g., within a programmable IC. The hardware portion of the electronic circuit within the programmable IC communicates with the software simulation within the host processing system, thereby allowing the circuit designer to test and simulate the entire electronic circuit.

Typically, the software portion of a hardware co-simulation executes within a high level modeling system (HLMS). The HLMS executes within the host processing system. The programmable IC communicates with the host processing system, and thus the software simulation, through a data link. With regard to the software portion of a hardware co-simulation, different portions of the circuit design, represented as software, execute within the HLMS in the host processing system. When the circuit design being simulated interacts with a processor, the processor also can be represented by, and execute as, software. Simulating the processor entirely within software, however, can be very time consuming. In such cases, it can be beneficial to implement the processor as hardware within the programmable IC. The processor disposed within the programmable IC can execute operational software as it normally would within the context of the circuit design being simulated. The processor then can communicate with the host processing system through the communication link during hardware co-simulation.

SUMMARY

The embodiments disclosed within this specification relate to integrated circuit devices (ICs) and, more particularly, to hardware co-simulation between a host processing system and a programmable IC comprising a processor. One embodiment of the present invention can include a system configured for hardware co-simulation involving a processor, disposed within a programmable IC, communicating with a host processing system executing a circuit simulation involving the processor.

The system can include a bus proxy comprising a primary slave disposed within the programmable IC and coupled to the processor via a bus, wherein the primary slave is configured to operate at a speed of, and is synchronized with, the bus. The system also can include a hardware co-simulation interface disposed within the programmable IC. The hardware co-simulation interface can be coupled to the bus proxy and coupled to the host processing system via a communication link. The hardware co-simulation interface can be configured to buffer simulation data from the bus proxy and the host processing system. The system can include a secondary slave configured to execute with the host processing system at a simulation speed that is asynchronous to the speed of the bus. The secondary slave can be configured to read data from, and write data to, the hardware co-simulation interface over the communication link, and communicate with at least one high level modeling system (HLMS) block executing within the circuit simulation. The primary slave can be configured to exert a slave wait signal on the bus responsive to detecting a bus request from the processor specifying an address corresponding to the HLMS block within the host processing system.

The hardware co-simulation interface can include a write buffer configured to store bus requests detected by the primary slave, a read buffer configured to store responses from the secondary slave, and a bridge control circuit configured to coordinate access of the bus proxy and the secondary slave to the write buffer and the read buffer during hardware co-simulation.

The bus proxy can include a slave buffer interface configured to record the bus request occurring at the speed of the bus and encode the bus request into a format storable within a memory. The slave buffer interface can be configured to write the encoded bus request to the write buffer.

The hardware co-simulation interface can be configured to send the encoded bus request to the secondary slave of the host processing system over the communication link. Responsive to receiving the encoded bus request, the secondary slave can be configured to play the encoded bus request to the HLMS block within the simulation.

The secondary slave can be configured to record a response from the HLMS block within the circuit simulation and store the response within the read buffer of the hardware co-simulation interface via the communication link.

The slave buffer interface can be configured to provide the response from the read buffer to the primary slave, wherein the primary slave is configured to de-assert the slave wait signal and play the response on the bus at the speed of the bus.

Thus, responsive to receiving a response from the host processing system, the bus proxy can be configured to de-assert the slave wait signal and play the response over the bus at the speed of the bus.

Another embodiment of the present invention can include a programmable IC configured to perform hardware-co-simulation. The programmable IC can include a processor coupled to at least a first input/output (I/O) pin, wherein the first I/O pin is a direct I/O pin, and a plurality of shift registers coupled to at least one port of the processor, wherein the at least one port is disposed entirely within the programmable IC. The programmable IC can include at least a second I/O pin coupled to the plurality of shift registers via programmable circuitry of the programmable IC that is exclusive of the processor. The first I/O pin can be coupled to the second I/O pin via a communication link external to the programmable IC. The programmable IC further can include an interface circuit coupled to the plurality of shift registers and a host processing system executing a circuit simulation involving the processor. The interface circuit can be configured to selectively move data from the host processing system into the processor via the plurality of shift registers and receive data generated by the processor via the plurality of shift registers.

The processor can be configured to output data from the first I/O pin to the plurality of shift registers through the communication link external to the programmable IC and the second I/O pin. The processor further can be configured to receive data sent from the host processing system through the plurality of shift registers to the second I/O pin and to the first I/O pin.

The interface circuit, during an interactive mode, can be configured to receive a single cycle transaction comprising one cycle of processor input data from the host processing system, provide the processor input data to the processor, and send one cycle of processor output data to the host processing system as a single cycle transaction.

The interface circuit, during a replay mode, can be configured to receive a multi-cycle transaction comprising a plurality replay sequences, provide processor input data to the processor from a selected replay sequence, compare actual processor output data to expected output data of the selected replay sequence, and, continue operation in replay mode or switch to interactive mode according to the comparison.

Another embodiment of the present invention can include a method of hardware co-simulation between a programmable IC comprising a processor and a host processing system executing a circuit simulation involving the processor. The method can include, when in a replay mode, receiving, from the host processing system, a multi-cycle transaction comprising a first plurality of replay sequences, wherein each replay sequence comprises processor input data and expected processor output data for one cycle of operation of the processor. While in replay mode and within the programmable IC, providing processor input data of a selected replay sequence to the processor and comparing actual processor output data with the expected processor output data from the selected replay sequence. Replay mode can be selectively exited according to the comparison of the actual processor output data with the expected processor output data.

The method can include, when the actual output data matches the expected output data for each replay sequence of the first plurality of replay sequences, remaining in replay mode and requesting a further multi-cycle transaction comprising a second plurality of replay sequences.

Responsive to detecting a mode change condition when in replay mode, the method can include entering an interactive mode and requesting the host processing system send a single cycle transaction comprising processor input data for a single cycle of operation without expected processor output data.

The method also can include selecting the mode change condition to be determining that the actual processor output data does not match the expected processor output data from the selected replay sequence or selecting the mode change condition to be executing a selected instruction within a program executing within the processor within the programmable IC.

When the programmable IC is operating in interactive mode, within the host processing system, responsive to detecting a further mode change condition, the method can include signaling the programmable IC to enter replay mode, selecting a predetermined number of replay sequences from a plurality of prior saved replay sequences from a prior hardware co-simulation involving the processor, and sending the selected replay sequences from the host processing system to the programmable IC within a single transaction.

The method can include selecting the further mode change condition to be identifying a correlation between the actual processor output data for at least one cycle of operation of the processor and processor output data of at least one prior saved replay sequence from a prior hardware co-simulation involving the processor. The method can include determining a correlation is identified when at least one header of the actual processor output data matches at least one header of the processor output data saved from the prior hardware co-simulation.

DETAILED DESCRIPTION

Figure 1:
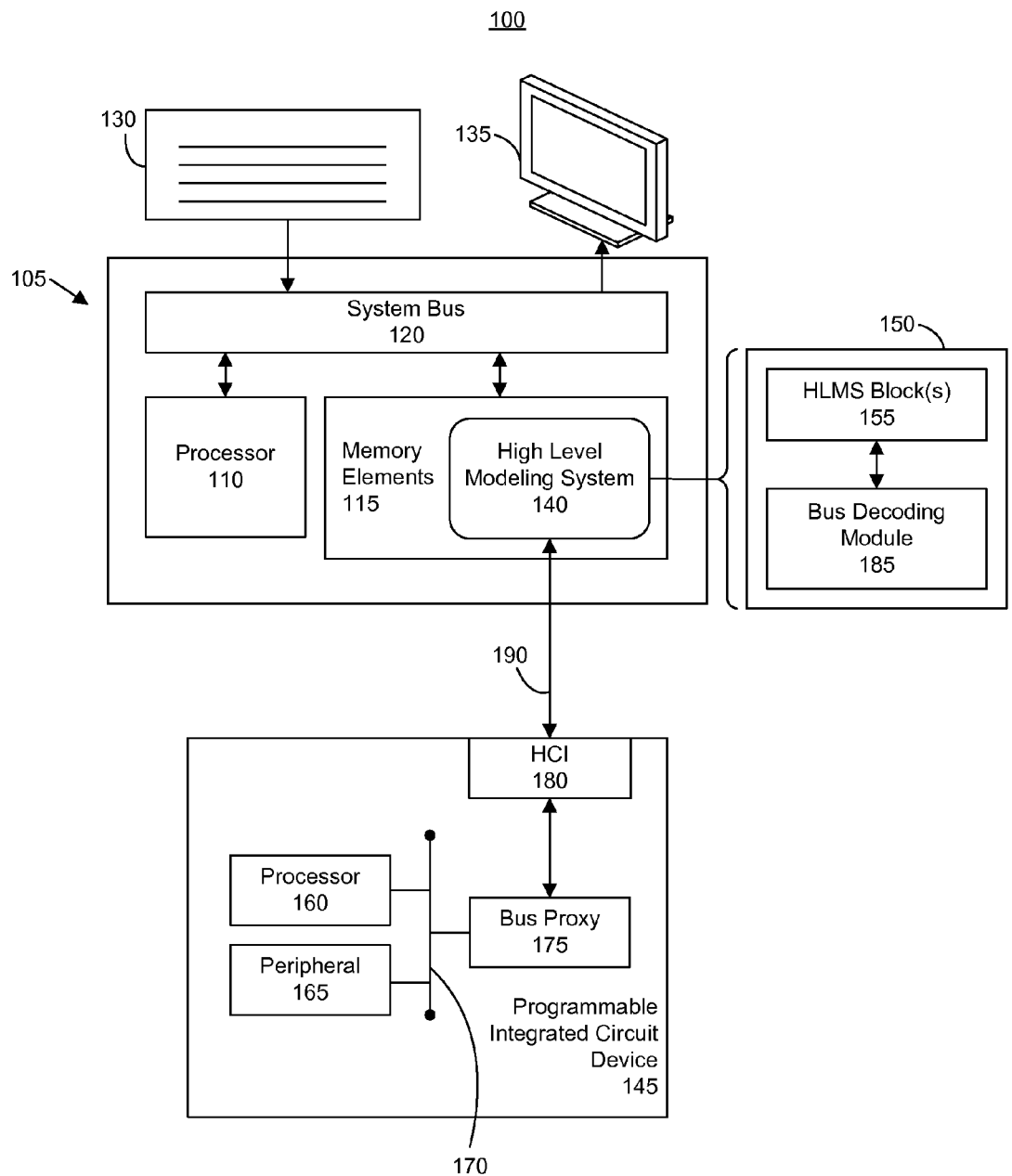
FIG. 1 is a first block diagram illustrating a system for hardware co-simulation in accordance with one embodiment of the present invention.

While the specification concludes with claims defining the features of the embodiments of the invention that are regarded as novel, it is believed that the embodiments of the invention will be better understood from a consideration of the description in conjunction with the drawings. As required, detailed embodiments of the present invention are disclosed herein; however, it is to be understood that the disclosed embodiments are merely exemplary of the inventive arrangements, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the embodiments of the invention.

The embodiments disclosed within this specification relate to hardware co-simulation involving a processor. More particularly, the embodiments relate to hardware co-simulation where a processor, that is part of the electronic circuit being simulated, is implemented as hardware within a programmable integrated circuit device (IC). The programmable IC is in communication with a host processing system executing the software simulation.

In accordance with the inventive arrangements disclosed herein, a bus proxy system is disclosed that facilitates inclusion of a hardware-based processor within hardware co-simulation. The bus proxy system permits transactions between the processor, disposed within the programmable IC, and the host processing system to occur over a bus without violating the bus protocol. The processor can be "free running" in that the processor is clocked by a clock source that is asynchronous to the clock used within the simulation executing within the host processing system.

In another aspect, data provided to the processor, and/or output from the processor, can be routed through the fabric of the programmable IC as opposed to entering or leaving the programmable IC directly through one or more input/output (I/O) pins coupled to the processor. In some cases, a processor disposed, e.g., embedded, within a programmable IC is coupled to one or more I/O pins that are not coupled to the programmable circuitry of the programmable IC. By coupling such I/O pins to other I/O pins of the programmable IC that can be coupled to the programmable circuitry of the programmable IC, data exchanged between the host processing system and the processor during hardware co-simulation can be processed within the programmable IC to provide circuit designers increased control over the hardware co-simulation process. Further, the processor and host processing system can selectively switch between multiple operating modes to increase the throughput of data exchanged between the processor and the host processing system during hardware co-simulation.

FIG. 1 is a first block diagram illustrating a system 100 for hardware co-simulation in accordance with one embodiment of the present invention. System 100 includes a host processing system 105, a programmable IC 145, and a busy proxy system to be described herein in greater detail.

Host processing system 105 can include at least one processor 110 coupled to memory elements 115 through a system bus 120. As such, host processing system 105 can store program code within memory elements 115. As illustrated in FIG. 1, the program code can be a high level modeling system (HLMS) 140. Processor 110 can execute the program code accessed from memory elements 115 via system bus 120. In one aspect, for example, host processing system 105 can be implemented as a computer that is suitable for storing and/or executing program code. It should be appreciated, however, that host processing system 105 can be implemented in the form of any system comprising a processor and memory that is capable of performing the functions described within this specification.

Memory elements 115 can include one or more physical memory devices such as, for example, local memory and one or more bulk storage devices (not shown). Local memory refers to random access memory or other non-persistent memory device(s) generally used during actual execution of the program code. Bulk storage device(s) can be implemented as a hard drive or other persistent data storage device. Host processing system 105 also can include one or more cache memories (not shown) that provide temporary storage of at least some program code in order to reduce the number of times program code must be retrieved from the bulk storage device during execution.

I/O devices such as a keyboard 130, a display 135, and a pointing device (not shown) optionally can be coupled to host processing system 105. The I/O devices can be coupled to host processing system 105 either directly or through intervening I/O controllers. Network adapters also can be coupled to host processing system 105 to enable host processing system 105 to become coupled to other systems, computer systems, remote printers, and/or remote storage devices through intervening private or public networks. Modems, cable modems, and Ethernet cards are examples of different types of network adapters that can be used with host processing system 105.

HLMS 140 is a computer-based circuit design tool that allows circuit designers to create circuits at a high level of abstraction. HLMS 140 can provide a graphic design environment within which circuit designers create circuit designs using a "drag-and-drop" design paradigm. A circuit designer can drag graphic blocks into the design environment. Each graphic block, referred to herein as an HLMS block, represents a particular circuit function. For example, each of HLMS blocks 155 can represent a function such as multiplexing, addition, multiplication, filtering, or the like. Within the design environment, the circuit designer also can specify connectivity and signal flows among the HLMS blocks 155 by drawing lines that interconnect the various HLMS blocks 155 within the graphic design environment to specify a circuit design 150.

HLMS 140, being executed in host processing system 105, can perform functions such as, for example, simulating and debugging circuit design 150. HLMS 140 also can generate a hardware implementation from the block representation of circuit design 150. For example, HLMS 140 can generate data bits, e.g., configuration data or a bitstream, to program programmable IC 145 to implement some or all of circuit design 150. HLMS 140 further can generate the hardware description language (HDL) files necessary to specify the hardware design corresponding to circuit design 150. Thus, as shown, HLMS 140 can simulate circuit design 150, which comprises HLMS blocks 155.

Programmable IC 145 can be disposed upon a test platform such as a circuit board or the like. Programmable IC 145 can include a processor 160, an optional peripheral 165, and a bus 170. Processor 160 can be an embedded processor within programmable IC 145. Further, processor 160 can be implemented as a hard processor or a soft processor. A "hard processor" refers to a processor that is formed of fixed circuitry within programmable IC 145. By comparison, a soft processor refers to a processor that is formed from the programmable fabric, e.g., circuitry, of programmable IC 145. Thus, a soft processor requires that programmable IC 145 be configured using configuration data to instantiate the soft processor from the various programmable circuit elements available on programmable IC 145. In either case, processor 160 can execute operational software, e.g., program code, to perform one or more functions as part of circuit design 150 during hardware co-simulation.

Peripheral 165 can be a device that communicates with processor 160. Peripheral 165 and processor 160 communicate through bus 170. In one embodiment, bus 170 can be implemented as a Processor Local Bus (PLB). A PLB supports read and write data transfers between master and slave devices equipped with a PLB bus interface and connected through PLB signals. The PLB architecture supports multiple master and slave devices. Each PLB master can be attached to the PLB through a separate address and separate read-data and write-data buses. PLB slaves can be attached to the PLB through shared, but decoupled, address, read-data, and write-data buses and a plurality of transfer control and status signals for each data bus. Access to the PLB is granted through a central arbitration mechanism (not shown) that allows masters to compete for bus ownership.

The PLB is used within this specification as an example bus to better illustrate various aspects of the embodiments described. It should be appreciated, however, that the embodiments described within this specification can utilize any of a variety of buses and/or bus configurations. Accordingly, the embodiments are not intended to be limited solely for use with PLBs.

The bus proxy system facilitates communication between processor 160 and host processing system 105. More particularly, the bus proxy system facilitates communication between processor 160 and HLMS blocks 155 executing within HLMS 140 as part of circuit design 150 being simulated. The bus proxy system can include bus proxy 175, hardware co-simulation interface (HCI) 180, and bus decoding module 185.

Bus proxy 175 can include a slave module that couples to bus 170. As shown, bus proxy 175 further couples to HCI 180. HCI 180 implements the necessary functionality to support communications between programmable IC 145 and host processing system 105 using a selected type of communication link 190. Examples of different communication links that can be used to couple programmable IC 145 with host processing system 105 can include, but are not limited to, Universal Serial Bus (USB), Ethernet, data links conforming to Universal Asynchronous Receiver/Transmitter protocols, Joint Action Test Group (JTAG) links, etc. HCI 180 effectively abstracts away the data link between programmable IC 145 and host processing system 105 so that a developer need not be concerned with the implementation details of supporting communication between host processing system 105 and programmable IC 145 during hardware co-simulation.

Bus decoding module 185 can be implemented as an HLMS block within the HLMS 140. A circuit designer can import bus decoding module 185 into circuit design 150 when hardware co-simulation is desired. In general, bus decoding module 185 functions as a slave module and can provide a software representation of the external interface of bus proxy 175. Port names, for example, of bus decoding module 185 can match port names of bus proxy 175. Bus decoding module 185 can interact with programmable IC 145 to automate transfer of hardware co-simulation data between programmable IC 145 and host processing system 105 via HCI 180. Bus decoding module 185 further can perform functions necessary for HLMS 140 to communicate with programmable IC 145 using the selected type of communication link 190 as described, and as implemented by HCI 180.

The bus proxy system spans two different clock domains. The first clock domain corresponds to that of processor 160. Processor 160 is free running in that processor 160 executes program code at a rate of the clock provided to processor 160. The clock of processor 160 is not synchronized with the simulation of circuit design 150 executed by HLMS 140. The second clock domain refers to the simulation speed HLMS 140. As known, the simulation speed can be a step-wise rate where the state of user HLMS blocks 155 can be observed and/or stopped on a cycle-by-cycle basis or can be free running. When the simulation is free running, it should be appreciated that the actual clock rate in real time of the simulation is on the order of several kilohertz, while processor 160 operates in the Megahertz range. As noted, the two clock domains can be asynchronous with respect to one another. Thus, the clock rate of processor 160 need not be a multiple of the clock rate of the simulation within HLMS 140.

When a circuit designer indicates to HLMS 140 that hardware co-simulation of HLMS blocks 155 is desired, HLMS 140 can automatically generate configuration data that is loaded into programmable IC 145. The configuration data, when loaded into programmable IC 145, can instantiate elements such as peripheral 165, bus proxy 175, HCI 180, and, if a soft processor, processor 160. The configuration data specifies those portions of circuit design 150 that are to be implemented in hardware and incorporated into the software simulation of HLMS blocks 155 as a hardware co-simulation. Thus, bus proxy 175, for example, and bus decoding module 185 can be automatically created by HLMS 140 responsive to a user request for hardware co-simulation involving a processor as described. Processor 160 executes program code that also can be considered part of circuit design 150.

When development of circuit design 150 is complete, the entirety of circuit design 150 can be implemented within hardware. The inclusion of bus proxy 175 and bus decoding module 185 allows HLMS blocks 155 to be simulated under real world bus conditions. Accordingly, when bus proxy 175 and bus decoding module 185 are removed from circuit design 150, user HLMS blocks 155, when implemented as hardware, will couple to bus 170 in place of bus proxy 175 and function as expected. HLMS blocks 155 require no modification since communication with processor 160 is performed via a bus in both the actual hardware implementation and within the hardware co-simulation.

By comparison, conventional techniques for hardware co-simulation involving a processor utilize communication mechanisms other than actual buses. Thus, when communication mechanisms used during hardware co-simulation are removed and replaced with the bus circuitry during actual implementation of the circuit design within hardware, the operation of the circuit design with the bus has not been subjected to testing through hardware co-simulation. Replacing the communication interface used during hardware co-simulation with the bus circuitry needed for actual implementation often introduces errors into the circuit design.

In accordance with the embodiments disclosed within this specification, the bus proxy system includes two slave units as described. The bus proxy system can be used to place free running processor 160 in a wait or idle state when processing by portions of circuit design 150 within host processing system 105 is required during hardware co-simulation. Placing processor 160 into a wait state prevents time out conditions on bus 170 that have prevented the use of a bus and processor architecture as described from being used in conjunction with hardware co-simulation.

Figure 2:
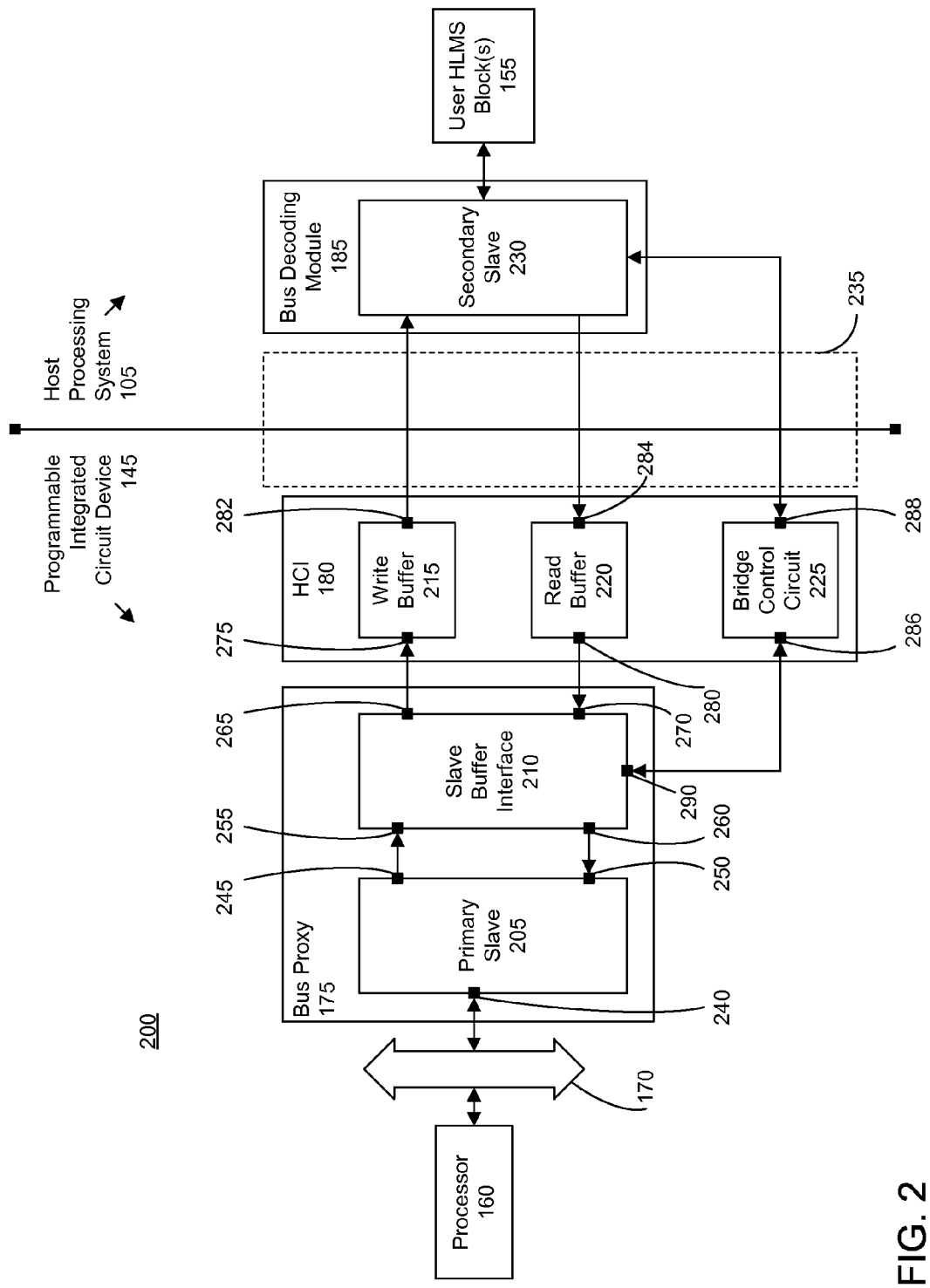
FIG. 2 is a second block diagram illustrating a bus proxy system in accordance with another embodiment of the present invention.

FIG. 2 is a second block diagram illustrating a bus proxy system 200 in accordance with another embodiment of the present invention. FIG. 2 illustrates a more detailed embodiment of bus proxy system 200 as described with reference to FIG. 1. As shown, bus proxy system 200 can include bus proxy 175, HCI 180, and bus decoding module 185. Like numbers will be used to refer to the same items throughout this specification.

Within programmable IC 145, bus proxy 175 includes a primary slave 205 and a slave buffer interface 210. Primary slave 205 is a bidirectional slave interface that is coupled to bus 170 through a bus compatible port 240. Primary slave 205, and thus port 240, operate at the clock rate of processor 160 and bus 170. As shown, primary slave 205 is coupled to slave buffer interface 210. More particularly, primary slave 205 includes ports 245 and 250. Port 245 is coupled to port 255 of slave buffer interface 210. Port 250 is coupled to port 260 of slave buffer interface 210.

Within this specification, the same reference characters are used to refer to terminals, signal lines, wires, and their corresponding signals. In this regard, the terms "signal," "wire," "connection," and "terminal" may be used interchangeably, from time-to-time, within the this specification. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be. The term "port" refers to an input or an output of a circuit block through which a signal or signals pass.

Slave buffer interface 210, in general, provides conditional read and/or write access to primary slave 205. Slave buffer interface 210 can record bus requests output from port 245 of primary slave 205 and received via port 255. Slave buffer interface 210 can encode, e.g., translate, the received bus requests, e.g., raw signals, into a format that is suitable for storing in memory and/or sending over communication link 235 from programmable IC 145 to host processing system 105. "Recording" a bus request, as used within this specification, refers to determining which signals of bus 170 were toggled, e.g., asserted and/or de-asserted, for a selected bus request and determining the timing of the toggled signals. The timing, for example, can specify the sequence of bus signals toggled, when such signals were asserted and/or de-asserted, and the duration each such signal is high, low, etc. The bus request is encoded by translating the recorded raw signal information into a digital data suitable for storage within a memory.

Slave buffer interface 210 further can include ports 265 and 270. As noted, slave buffer interface 210 can encode the recorded bus request into a format that can be written to write buffer 215. For example, the recorded bus request can be encoded into packetized data or some other format that is suitable for sending via communication link 235, which can utilize Internet Protocol. Slave buffer interface 210 provides encoded bus requests to HCI 180. More particularly, slave buffer interface sends, or writes, encoded bus requests to write buffer 215 through port 265. Write buffer 265 receives the encoded bus requests via port 275.

Slave buffer interface 210 receives encoded responses to bus requests from HCI 180. More particularly, slave buffer interface 210 receives encoded responses output from port 280 of read buffer 220 via port 270. Slave buffer interface 210 decodes the encoded responses and provides the resulting decoded responses to primary slave 205. Decoding a response can include, for example, translating the response data from a packetized form into particular signals to be toggled, e.g., asserted and/or de-asserted, and determining the timing for toggling the signals. Slave buffer interface 210 provides instructions to primary slave 205, through port 260, for playing back the response, i.e., asserting and/or de-asserting actual bus signals with specified timing, over bus 170. Primary slave 205 receives the instructions via port 250.

HCI 180 can include write buffer 215, read buffer 220, and a bridge control circuit 225. In one embodiment, write buffer 215 and read buffer 220 each can be implemented as a first-in-first-out (FIFO) memory. The FIFO memories can be two port memories where each port of the FIFO memory can operate at a different clock frequency, e.g., asynchronously with respect to the other port of the FIFO memory.

Write buffer 215 can store encoded bus requests received via port 275 from slave buffer interface 210. The encoded bus requests stored within write buffer 215 are eventually output from port 282 and sent to bus decoding module 185 over communication link 235. Read buffer 220 receives encoded responses via port 284 from bus decoding module 185 via communication link 235 and stores the encoded bus responses. Encoded responses from read buffer 220 are subsequently output from port 280 and sent to slave buffer interface 210, which decodes the encoded response for playback over bus 170 via primary slave 205.

Port 275 and port 282 of write buffer 215 can be clocked independently with respect to one another. Further ports 275 and 282 can be asynchronously clocked. The same is true of ports 280 and 284. Ports 275 and 280, for example, can be clocked at the clock rate of processor 160. Ports 282 and 284 can be clocked at the clock rate of communication link 235 and/or the simulation executing within host processing system 105.

Bridge control circuit 225 coordinates operation of bus proxy 175 with bus decoding module 185 by providing read and/or write instructions to slave buffer interface 210 and secondary slave 230 as shown. Bridge control circuit 225 communicates, via port 286, with a control port 290 of slave buffer interface 210. Bridge control circuit 225 communicates with secondary slave 230 via port 288. Bridge control circuit 225 can receive clock signals of each clock domain spanned by write buffer 215 and read buffer 220 in order to coordinate reading and/or writing to both write buffer 215 and read buffer 220. For example, port 286 can be clocked as ports 275 and 280 are clocked. Port 288 can be clocked as ports 282 and 284 are clocked. Thus, bridge control circuit 225 coordinates the flow of encoded bus requests from bus proxy 175 to bus decoding module 185 via write buffer 215. Bridge control circuit 225 further controls the flow of encoded responses from bus decoding module 185 to bus proxy 175 via read buffer 220. For example, bridge control circuit 225 can indicate when data can be written to a buffer, when data is or has been written, and correspondingly, when data can be read from the buffer so as to avoid overwrite or overflow conditions. Bridge control circuit 225 enables additional features such as burst transfers over communication link 235.

As noted, bus decoding module 185 can be implemented in the form of an HLMS block within the HLMS. Bus decoding module 185 can include a secondary slave 230 that communicates with HCI 180 via communication link 235 and HLMS blocks 155 within the HLMS during simulation. Secondary slave 230 provides a slave bus interface through which HLMS blocks 155 can access processor 160 using legal bus transactions.

In operation, primary slave 205 listens for bus requests on bus 170. In particular, primary slave 205 listens for bus requests directed to one or more of HLMS blocks 155 executing within host processing system 105. When primary slave 205 recognizes a bus request from processor 160 on bus 170 that specifies an address corresponding to one of HLMS blocks 155, primary slave 205 can responsively assert a slave wait signal on bus 170. The asserted slave wait signal places processor 160 in a wait state. Processor 160 can continue to wait until such time that the slave wait signal is de-asserted by primary slave 205. While processor 160 is in the wait state, primary slave 205 can begin the process of providing the detected bus request to host processing system 105.

Primary slave 205 passes the bus request, whether a read or a write request, to slave buffer interface 210. Slave buffer interface 210 records and encodes the bus request. Under control of bridge control logic 225, slave buffer interface 210 can store the encoded bus request into write buffer 215. Secondary slave 230, under control of bridge control logic 225, can read the encoded bus request from write buffer 215.

Secondary slave 230 plays back the encoded bus request to the user HLMS blocks 155 specified in the original address of the bus request received by primary slave 205. It should be appreciated that information such as the address to which the bus request is directed can be preserved as the encoded bus request is provided to host processing system 105. In any case, secondary slave 230 plays back the encoded bus request to the designated HLMS block(s) 155 at simulation speed, whether the simulation is free running or in a single step mode, for example.

The response generated by the HLMS block(s) 155 to the encoded bus request can be received by secondary slave 230. The response can be considered to be encoded in the sense that the response is digitized data indicating which signals of bus 170 are to be toggled and the timing of the signals to be toggled. In any case, under the control of bridge control circuit 225, secondary slave 230 can write the encoded response to read buffer 220 via communication link 235. As noted, secondary slave 230 can perform any data formatting necessary to send the encoded response over communication link 235.

Slave buffer interface 210, under control of bridge circuit 225, can read the encoded response from read buffer 220. Slave buffer 210 can decode the response and provide the decoded response to primary slave 205. Primary slave 205, responsive to receiving the decoded response, can de-assert the slave wait signal and playback the response on bus 170. Playback of the response and de-assertion of the slave wait signal can occur in any order depending upon the requirements of the particular type of bus used to implement bus 170. Primary slave 205 can play the decoded response by toggling the appropriate signals of bus 170 according to the timing specified by the decoded response. When the response is played by primary slave 205, the response is played back at the speed of bus 170 and processor 160, which is still free running.

FIG. 2 illustrates that bus proxy system 200 can incorporate a processor that is free running, and embedded within a programmable IC, within a simulation and communicate with that processor using an actual bus without violating the controlling bus protocol. Using the slave wait signal, the processor executing within the programmable IC can be placed in a wait state in a non-destructive manner allowing time for the bus request to propagate to the simulation within the host processing system and for a response from the simulation to be propagated back to the programmable IC to be played back on the bus at processor speed. This prevents bus requests issued to HLMS blocks within the host processing system from timing out as typical bus protocols limit the amount of time the processor will wait for a response to a bus request absent assertion of the slave wait signal.

The number of ports illustrated for a particular circuit block is not intended as a limitation of the embodiment illustrated in FIG. 2 or the embodiments illustrated within this specification. For example, slave buffer interface 210 is shown to include unidirectional ports 255 and 260 for purposes of illustration and clarity. It should be appreciated, however, that ports 255 and 265 can be represented schematically in the form of a single, bi-directional port that communicates with primary slave 205.

Figure 3:
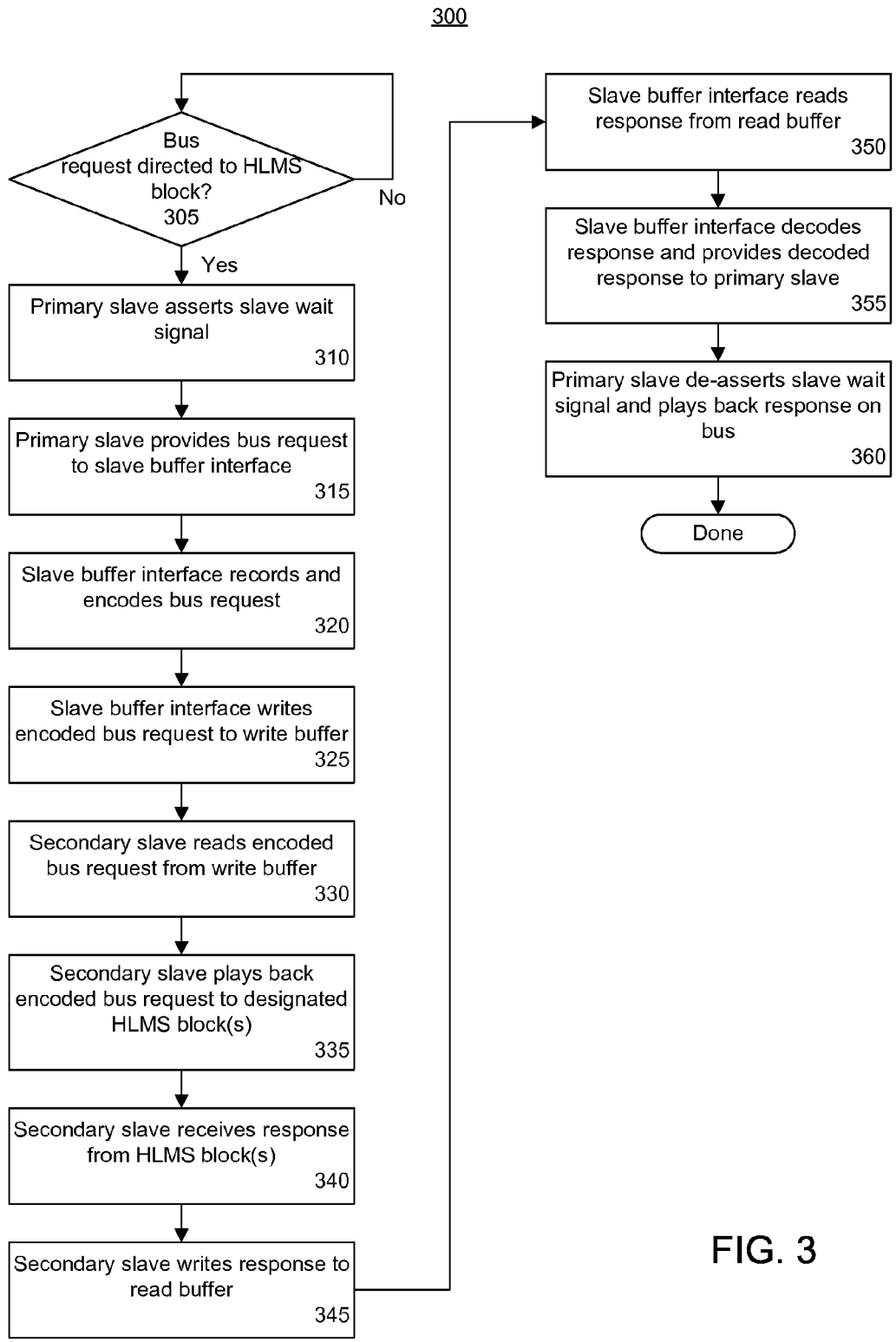
FIG. 3 is a first flow chart illustrating a method of hardware co-simulation involving a bus proxy system in accordance with another embodiment of the present invention.

FIG. 3 is a first flow chart illustrating a method 300 of hardware co-simulation involving a bus proxy system in accordance with another embodiment of the present invention. Method 300 can begin in a state where the circuitry described with reference to FIGS. 1 and 2 has been instantiated within a programmable IC. The processor embedded within the programmable IC can be free running. Further, the host processing system can execute an HLMS, which in turn executes a simulation involving a plurality of HLMS blocks as described.

Beginning in step 305, the bus proxy, and more particularly, the primary slave, can determine whether a bus request directed to an HLMS block within the host processing system has been detected on the bus. As noted, a bus request directed to the HLMS will specify an address that is associated with one of the HLMS blocks simulated within the HLMS. When a bus request directed to an HLMS block is detected on the bus, method 3000 can proceed to step 310. When no bus request is detected on the bus that is directed to an HLMS block, method 300 can continue looping through step 305.

In step 310, responsive to detecting the bus request, the primary slave can assert the slave wait signal. The processor coupled to the primary slave via the bus is, in response to the slave wait signal, placed in a wait state. Placing the processor in the wait state prevents the bus request from timing out. In step 315, the primary slave can provide the bus request to the slave buffer interface.

In step 320, the slave buffer interface can record the bus request and encode the bus request. As noted, the primary slave and the slave buffer interface can operate at the rate of the clock driving the processor of the programmable IC when in free running mode. In step 325, the slave buffer interface can, under control of the bridge control circuit, store the encoded bus request into the write buffer of the HCI. The HCI, in effect, is a boundary between the clock domain corresponding to the processor of the programmable IC and the clock domain corresponding to the simulation executing within the HLMS within the host processing system. Data can be written to, or read from, the HCI buffers by the secondary slave interface at the rate corresponding to the processor speed. Data also can be written to, or read from, the HCI by the secondary slave at a rate corresponding to the simulation executing within the HLMS and/or the communication link between the programmable IC and host processing system.

In step 330, the secondary slave, under the control of the bridge control circuit, can read the encoded bus request from the write buffer. In step 335, the secondary slave can play back the encoded bus request to the HLMS block(s) designated in the original bus request. The secondary slave can play back the bus request at a speed or rate that corresponds to the speed of the simulation.

In step 340, the secondary slave, after waiting for the designated HLMS block(s) to perform any processing required or necessitated by the bus request, can receive a response to the bus request from the HLMS block(s). The secondary slave can receive the response at the speed of the simulation. The response can be specified in any of a variety of digital data formats. As such, the response can specify which signals of the bus are to be toggled as well as the timing of signals to be toggled. In step 345, the secondary slave, under the control of the bridge control circuit, can write the response to the read buffer of the HCI.

In step 350, the slave buffer interface can read the response from the read buffer. The slave buffer interface, in step 355, decodes the response and provides the decoded response to the primary slave. In step 360, responsive to receiving the decoded response, the primary slave can de-assert the slave wait signal and play back the response on the bus at the processor speed. The primary slave can toggle the signals specified by the response in accordance with the timing information to accomplish playback of the response on the bus.

Figure 4:
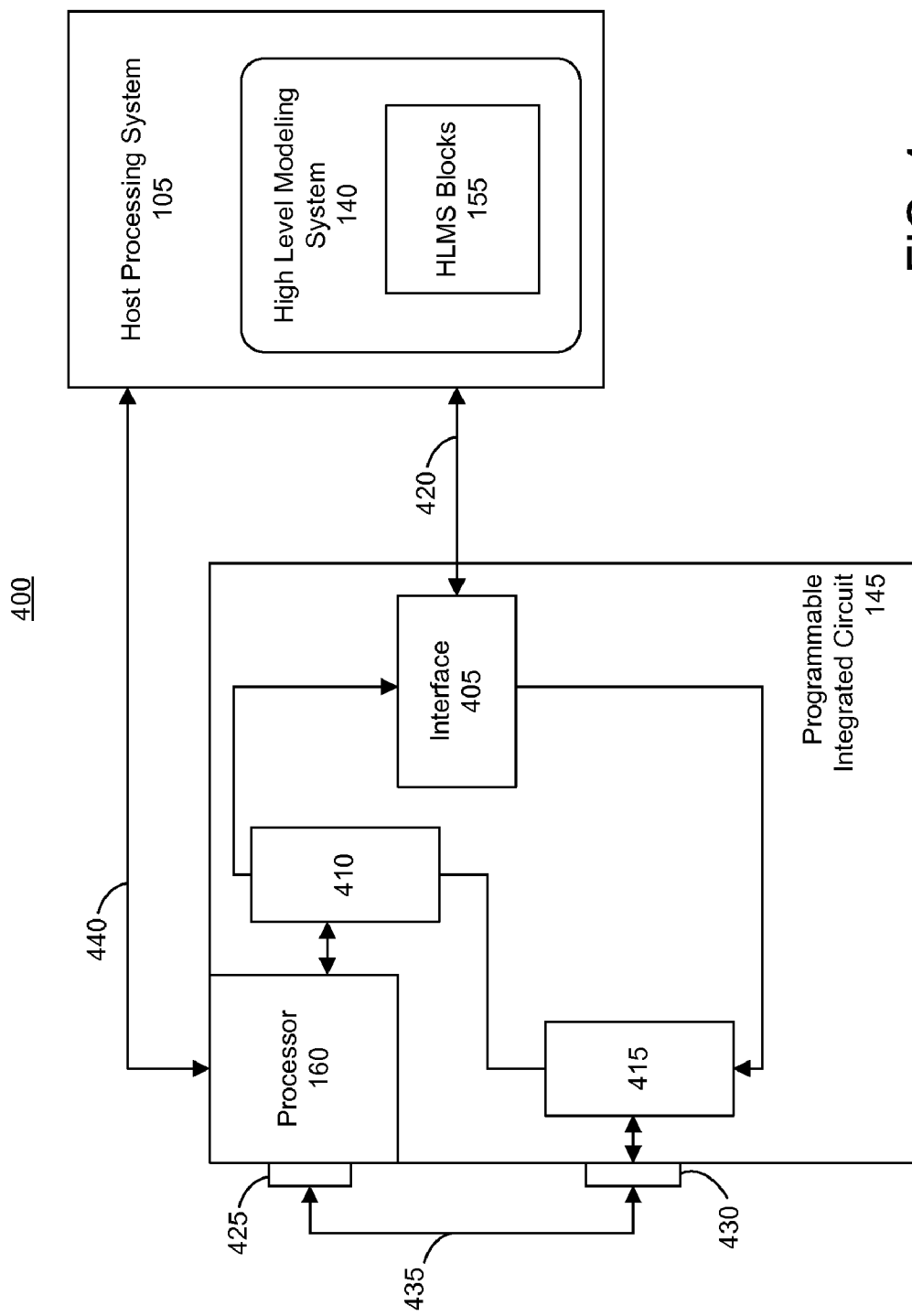
FIG. 4 is a third block diagram illustrating a system for hardware co-simulation in accordance with another embodiment of the present invention.

FIG. 4 is a third block diagram illustrating a system 400 for hardware co-simulation in accordance with another embodiment of the present invention. System 400 can include host processing system 105 executing HLMS 140 and a programmable IC 145. As shown, HLMS 140 can include one or more HLMS blocks 155.

Programmable IC 145, in this embodiment, can include an interface 405, a plurality of shift registers 410 and 415, and processor 160. Interface 405 can be a circuit disposed within programmable IC 145 that handles communications between programmable IC 145 and host processing system 105. Interface 405 can be configured to communicate over a selected type of communication link, e.g., USB, Ethernet, serial UART, JTAG, etc., illustrated in FIG. 4 as communication link 420. In addition, interface 405 can control shift registers 410 and 415 to facilitate shifting data into processor 160 as input and/or receiving data output from processor 160.

Programmable IC 145 further can be coupled to host processing system 105 via communication link 440. In one embodiment, communication link 440 can be a JTAG communication link over which configuration data for programming programmable IC 145 can be downloaded into programmable IC 145. The configuration data can instantiate desired circuitry, e.g., shift registers 410 and 415 and interface 405, for performing hardware co-simulation as described herein.

While processor 160 was described as being implemented as either a hard or a soft processor within prior examples, in the example illustrated in FIG. 4, processor 160 is a hard processor. Further, within this example, processor 160 can include one or more additional supporting circuits and/or other peripherals. For example, processor 160 can be representative of an entire processor subsystem.

Processor 160 can be directly coupled to one or more I/O pins, depicted as block 425, of programmable IC 145. As used within this specification, an I/O pin of programmable IC 145 that is directly coupled to processor 160 is an I/O pin that is electrically coupled to the circuitry implementing processor 160 without traversing or being routed through programmable circuitry of programmable IC 145. More particularly, signals within processor 160 can be routed to I/O pins 425, referred to herein as "direct I/O pins," in an manner that bypasses programmable circuitry of programmable IC 145. In this regard, processor 160, for example, can access direct I/O pins 425 without having to specifically configure programmable circuitry of programmable IC 145 to establish connections between the direct I/O pin(s) 425 and processor 160 by loading configuration data. It should be appreciated that I/O pins and direct I/O pins refer to pins that send and/or receive signals to and/or from locations external to programmable IC 145.

Shift register 410, as shown, can be coupled to interface 405, shift register 415, and to processor 160 through one or more "on-chip" communication links. Shift register 415 can be coupled to interface 405 and shift register 410 through one or more on-chip communication links. Shift register 415, by appropriately configuring programmable circuitry of programmable IC 145, also can be coupled to one or more I/O pins 430. In one embodiment, shift registers 410 and 415 can be sized according to the number of direct I/O pins 425 to be monitored. For example, if processor 160 comprises 2,000 direct I/O pins 425, each of shift registers 410 and 415 can be implemented to store approximately 2 kilobits (kbits) of data.

Due to the direct coupling of direct I/O pins 425 with processor 160, data that is input to and/or output from direct I/O pins 425 does not flow through other portions of programmable IC 145. Thus, such data does not flow through interface 405 for coordinated communication with host processing system 105. Accordingly, coordinating operation of processor 160 with the simulation executing within host processing system 105 can be difficult.

In accordance with one embodiment of the present invention, one or more of direct I/O pins 425 can be coupled to I/O pins 430, for example, through a circuit board or other platform upon which programmable IC 145 is disposed. Thus, communication link 435 is formed within the platform upon which programmable IC 145 is disposed, e.g., external to programmable IC 145. Using communication link 435, data sent from processor 160, or to be provided to processor 160, can be exchanged over communication link 420 through interface 405.

In accordance with another embodiment, interface 405 can function in cooperation with HLMS 140 to switch between an interactive mode and a replay mode. In general, interactive mode entails providing one cycle of information from host processing system 105 to programmable IC 145 within each transaction. Replay mode entails providing multiple cycles of information from host processing system 105 to programmable IC 145 within a single transaction.

Consider the case where communication link 420 is an Ethernet communication link. In that case, the minimal packet size exchanged over communication link 420 is 8 kilobytes (Kbytes) in size, which corresponds to 64 kbits. In situations where less than 64 kbits needs to be communicated using the 64 kbit packet size, bandwidth is wasted. Ethernet communication links require significant overhead to maintain. Due to the parallel processing ability of programmable ICs, the time required to de-packetize a packet comprising 2 kbits of data, for example, is approximately equal to the time required to de-packetize a packet comprising 64 kbits of data.

As noted, in interactive mode during hardware co-simulation, only simulation data for a single cycle of operation of processor 160 is sent from host processing system 105 to interface 405 as a transaction. Thus, in interactive mode, a single transaction comprises simulation data for one cycle of operation of processor 160. Continuing with the example where processor 160 includes 2,000 direct I/O pins 425, 2 kbits of processor input data can be sent in a single transaction in interactive mode. A transaction comprising a single cycle of processor input data can be referred to as a single cycle transaction. Thus, communication link 420 supports packet sizes that are larger than the total number of bits that can be provided to processor 160 for a single cycle of operation.

Data sent from host processing system 105 to processor 160 is transmitted to interface 405, which pushes the data into input shift registers of shift registers 410 and 415, and then into processor 160. Processor 160 then executes for one clock cycle using the data shifted in through the input shift registers. Data generated by processor 160 though execution of the input data, referred to as actual processor output data, is pushed to output shift registers of shift registers 410 and 415 and into interface 405 for transmission to host processing system 105.

In replay mode, a plurality of cycles of simulation information can be sent within a single transaction, e.g., a packet, from host processing system 105 to processor 160. More particularly, a plurality of replay sequences can be sent. Each replay sequence can include processor input data for one cycle of operation of processor 160 and expected processor output data from processor 160 when the processor input data for the replay sequence is provided to processor 160 as input. A transaction comprising more than one replay sequence, and thus processor input data for more than one cycle of operation, can be referred to as a multi-cycle transaction.

Replay mode can be beneficial in cases where one or more replay sequences have been collected and processor 160 is expected to pass through a plurality of known states corresponding to the stored replay sequences. One example where this is the case is when the simulation involves processor 160 booting an operating system. Processor 160 will pass through a variety of known states during the boot process. Once the boot process is performed one time and a plurality of replay sequences are stored, the replay sequences can be used in subsequent hardware co-simulations to form multi-cycle transactions.

In illustration, with a transaction size of 64 kbits, 32 kbits of processor input data and 32 kbits of expected processor output data can be sent in a single multi-cycle transaction. For purposes of illustration, bits dedicated to header information and the like are ignored in this example. Thus, presuming that processor 160 receives 2 kbits of processor input data each clock cycle and generates 2 kbits of actual output data each clock cycle, 16 replay sequences, comprising 16 cycles of processor input data and corresponding expected processor output data, can be sent from host processing system 105 to programmable IC 145 in a single multi-cycle transaction.

The 64 kbits of data sent in the multi-cycle transaction to processor 160 is received by interface 405. Interface 405 can push a first set of processor input data from a first replay sequence into processor 160 via shift registers 410 and/or 415. Processor 160 then operates upon the first set of processor input data for a clock cycle. Data generated by processor 160 though execution of the input data, referred to as actual processor output data, is pushed to interface 405 via shift registers 410 and/or 415. Interface 405 compares the actual processor output data with the expected processor output data of the first replay sequence received as part of the multi-cycle transaction. Depending upon whether the expected processor output data matches the actual output data from processor 160, interface 405 can continue operation in replay mode or revert back to interactive mode.

Figure 5:
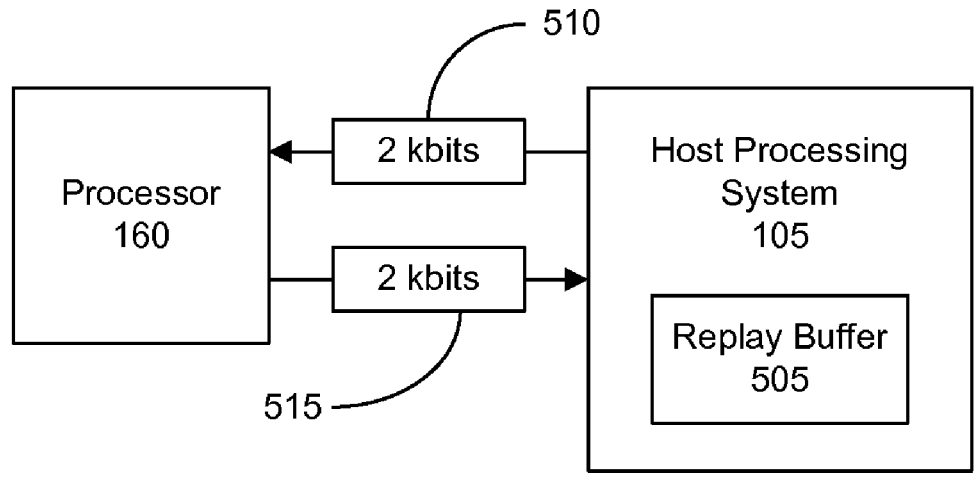
FIG. 5 is a fourth block diagram illustrating operation of an interactive mode during hardware co-simulation in accordance with another embodiment of the present invention.

FIG. 5 is a fourth block diagram illustrating operation of interactive mode during hardware co-simulation in accordance with another embodiment of the present invention. Host processing system 105 includes a replay buffer 505. Replay buffer 505 can store simulation data from a prior hardware co-simulation involving processor 160. In one embodiment, the stored simulation data can comprise each replay sequence generated during the prior hardware co-simulation. In another embodiment, replay buffer 505, can include selected replay sequences from the prior hardware co-simulation.

In interactive mode, the software simulation executing within host processing system 105, e.g., within the HLMS, and processor 160 operate in a step wise fashion. As shown, 2 kbits of data, denoted as single cycle transaction 510, corresponding to one cycle of data for processor 160, is sent from host processing system 105 to processor 160. In one embodiment, single cycle transaction 510 can be generated during the simulation executing within the HLMS of host processing system 105. In another embodiment, data 510 can be read from replay buffer 505. In any case, the 2 kbits of actual processor output data generated processor 160 can be sent from processor 160 to host processing system 105 as single cycle transaction 515.

Figure 6:
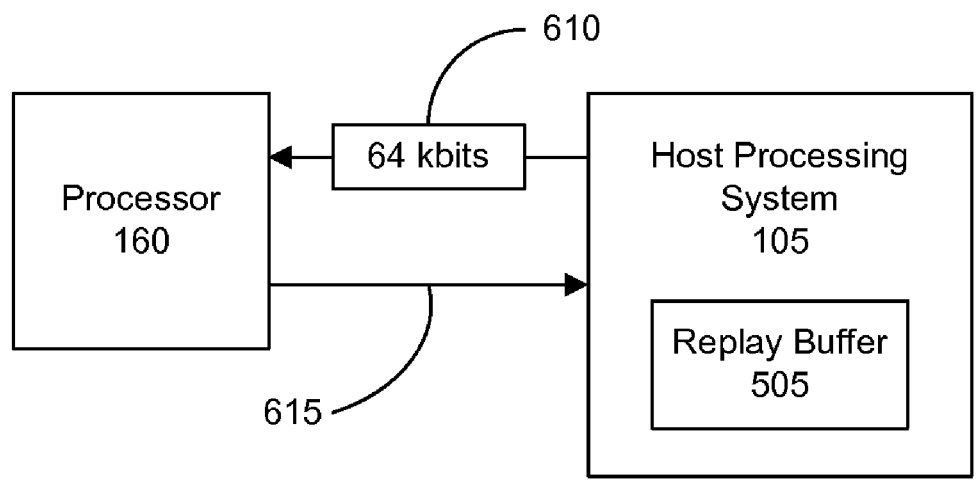
FIG. 6 is a fifth block diagram illustrating operation of a replay mode during hardware co-simulation in accordance with another embodiment of the present invention.

FIG. 6 is a fifth block diagram illustrating operation of replay mode during hardware co-simulation in accordance with another embodiment of the present invention. In replay mode, replay sequences are sent from host processing system 105 to processor 160. As shown, 64 kbits of data, denoted as multi-cycle transaction 610, is sent from host processing system 105 to processor 160. Once multi-cycle transaction 610 is loaded into the interface (not shown), the interface can begin to shift processor input data, e.g., 2 kbits in size for a single cycle of operation, from the replay sequence sent in the multi-cycle transaction into processor 160. Each time processor 160 outputs actual data, the interface within the programmable IC can compare the actual processor output data with the expected processor output data of the same replay sequence from which the processor input data was provided and operated upon by processor 160. When the expected processor output data matches the actual processor output data, replay mode continues. Further sets of processor input data can be provided to processor 160 by the interface for subsequent clock cycles presuming the actual processor output data continues to match the expected processor output data. When the 64 kbits of multi-cycle transaction 610 has been exhausted, the interface can request a further multi-cycle transaction from host processing system 105 via signal 615.

When the interface determines that the actual processor output data does not match the expected processor output data, the interface can output signal 615 indicating that processor 160 and host processing system are to revert to interactive mode. In one embodiment, the HLMS within host processing system 105 and/or the interface can monitor for mode change conditions that cause the hardware co-simulation system to switch between interactive and replay modes. A mismatch between actual processor output data and expected processor output data is one example of a mode change condition.

Figure 7:
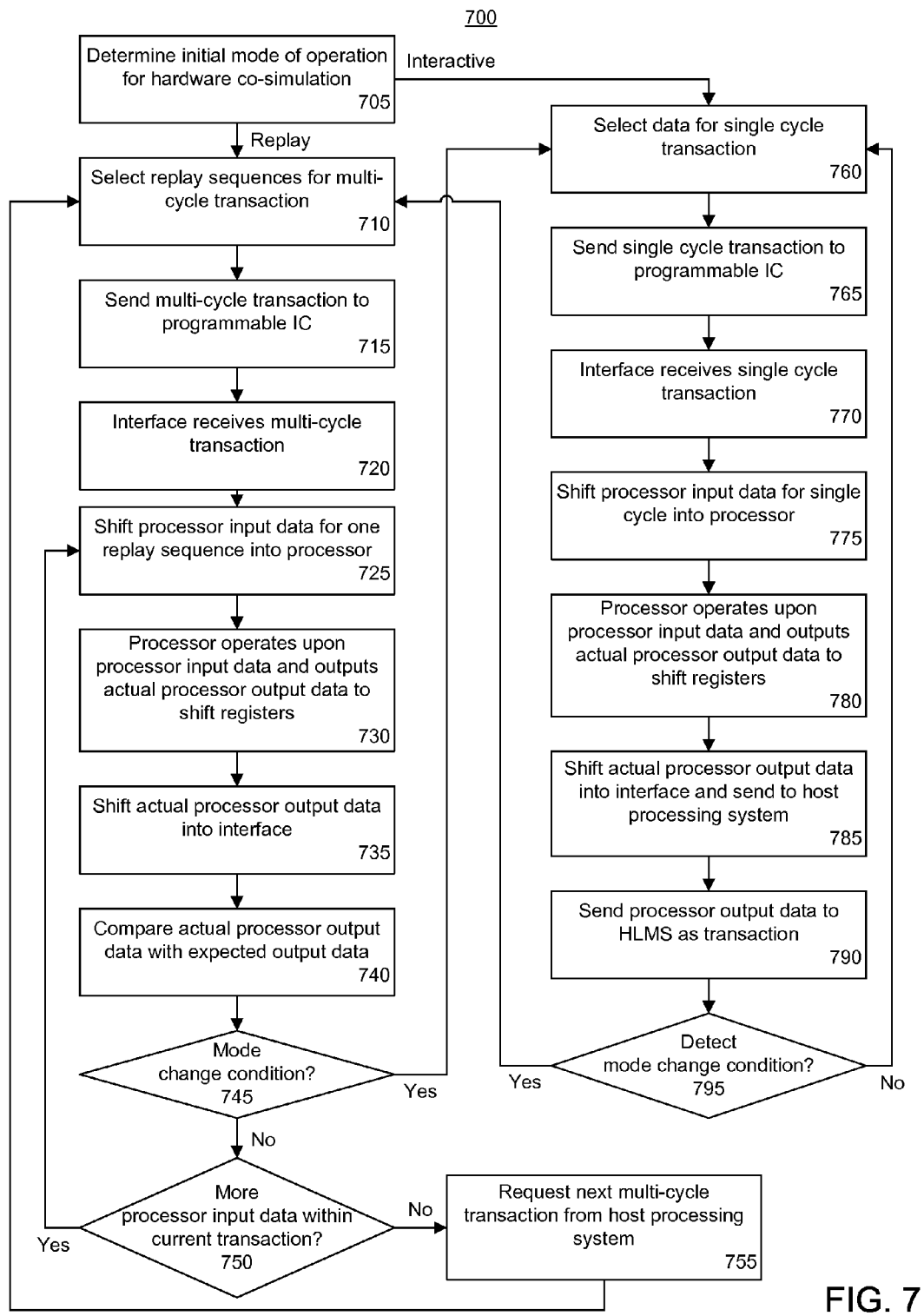
FIG. 7 is a second flow chart illustrating a method of hardware co-simulation in accordance with another embodiment of the present invention.

FIG. 7 is a second flow chart illustrating a method 700 of hardware co-simulation in accordance with another embodiment of the present invention. Method 700 can begin in a state where the circuitry described with reference to FIGS. 4-6 has been instantiated within the programmable IC, e.g., as part of a hardware co-simulation session. Further, the host processing system can execute an HLMS, which can begin executing a simulation involving a plurality of HLMS blocks as described.

In step 705, the HLMS can determine whether to begin the hardware co-simulation in interactive mode or within replay mode. The initial determination of which mode to enter can be one that is programmed or selected by the circuit designer. As noted, operating in replay mode presumes the availability of prior simulation data in the form of replay sequences and that the processor disposed within the programmable IC passes through one or more known states corresponding to the replay sequences.

Continuing with step 710, where replay mode has been selected, the HLMS can select a plurality of replay sequences from prior simulation data. As noted, each replay sequence can include processor input data for one cycle of operation and expected processor output data that is expected to be generated by the processor on the next clock cycle in consequence of processing the processor input data of the replay sequence. The HLMS can form a multi-cycle transaction from the selected replay sequences.

In step 715, the HLMS can send the multi-cycle transaction to the programmable IC for processing. In step 720, the interface disposed within the programmable IC receives the multi-cycle transaction as the current multi-cycle transaction. In step 725, the interface shifts processor input data from a first replay sequence received in the multi-cycle transaction into the processor disposed within the programmable IC. In step 730, the processor operates upon the processor input data and outputs actual processor output data to the shift registers in the next clock cycle. In step 735, the interface shifts the actual processor output data into the interface for comparison with expected processor output data of the first replay sequence. Accordingly, in step 740, the interface compares the actual processor output data with the expected processor output data of the first replay sequence.

In step 745, the interface determines whether a mode change condition has been detected. If so, method 700 proceeds to step 760. If not, method 700 proceeds to step 750. One example of a mode change condition is when the actual processor output data does not match the expected processor output data. This type of mode change condition is detected by the interface through the comparison described in step 740. It should be appreciated, however, that the HLMS can initiate a mode change and notify the interface of such a change at any point during the hardware co-simulation.

When no mode change condition is detected, in step 750, the interface determines whether further replay sequences, e.g., processor input data, of the current multi-cycle transaction remain to be processed. If so, method 700 loops back to step 725 to shift processor input data of a next replay sequence of the current multi-cycle transaction into the processor. When no further replay sequences remain to be processed for the current multi-cycle transaction, method 700 proceeds to step 755. In step 755, the interface can request a further multi-cycle transaction from the HLMS executing within the host processing system. Accordingly, method 700 can loop back to step 710 for continued hardware co-simulation within the replay mode. As noted, however, the HLMS can place the programmable IC into interactive mode at any time, e.g., in response to a request for a next multi-cycle transaction when no further multi-cycle transactions remain to be sent to the programmable IC.

Continuing with step 760, where a mode change condition has been detected, the hardware co-simulation can begin operating in interactive mode. Accordingly, the HLMS can select data for inclusion in a single cycle transaction. The single cycle transaction used within interactive mode does not include expected output data. Rather, the single cycle transaction includes processor input data for one cycle of operation of the processor, e.g., one set of processor input data. Typically, the processor input data used during interactive mode will be generated by the executing simulation within the HLMS as opposed to being obtained from prior simulation data.

In step 765, the HLMS can send the single cycle transaction to the programmable IC. In step 770, the interface within the programmable IC can receive the single cycle transaction. In step 775, the interface can shift the processor input data from the single cycle transaction into the processor as input. Accordingly, in step 780, the processor can operate upon the processor input data and output actual processor output data to the shift registers on the next clock cycle. In step 785, the interface can shift the actual processor output data into the interface. In step 790, the interface can send the actual processor output data to the HLMS as a transaction, thereby causing a further single cycle transaction to be sent, unless the HLMS detects a mode change condition.

In step 795, the HLMS can determine whether a mode change condition has been detected. If so, method 700 can loop back to step 710 to begin operating in replay mode. If not, method 700 can loop back to step 760 to continue operating in interactive mode. The determination as to whether a mode change condition has been detected that is made by the HLMS in step 795 can differ from the determination made by the interface of the programmable IC in step 745.

In one embodiment, the HLMS can perform pattern matching. The HLMS can compare processor input data provided to the processor and actual processor output data generated by the processor to determine whether the data of the current hardware co-simulation session matches, e.g., correlates with, one or more replay sequences from a prior hardware co-simulation session. When the HLMS identifies a pattern or match between one or more cycles of operation of the processor for the current hardware co-simulation data with replay sequence(s) from a prior hardware co-simulation session, the HLMS can enter replay mode. In that case, the HLMS can generate a multi-cycle transaction using a plurality of replay sequences immediately following the identified or matching pattern from the prior hardware co-simulation data.

It should be appreciated that the number of replay sequences selected, though limited by packet sizes of the communication link between the programmable IC and the host processing system, need not be of a number required to "fill" the packet. Rather, if, for example, only three replay sequences are available from the prior simulation data after having identified match, those three replay sequences can be sent as part of a multi-cycle transaction.

When comparing hardware co-simulation data for a current session to that of prior hardware co-simulation data to determine whether a correlation exists, a variety of different techniques can be used. In one embodiment, the entirety of each single cycle transaction can be compared, e.g., all portions of the processor input data and processor output data with replay sequences from the prior hardware co-simulation session to determine whether matches exist. In another embodiment, headers can be compared to determine whether matches exist to decrease the time needed to perform the comparison.

In yet another embodiment, a circuit designer can specify a trigger that causes, or is interpreted as, a mode change condition. One example of a trigger can include when the processor within the programmable IC enters a specified operating state. When the program counter of the processor, for example, reaches a predetermined value, the hardware co-simulation can enter replay mode or interactive mode as the case may be. While the mode change conditions evaluated by the HLMS and the interface within the programmable IC can differ, checking the program counter value, which can be output from the processor as part of the actual processor output data on any given cycle of operation, is one example that can be performed by either the interface or the HLMS to determine that a mode change condition has occurred.

The embodiments described within this specification provide methods, systems, and apparatus for performing hardware co-simulation involving a processor. The various examples disclosed herein are not intended to be limiting, but rather illustrative of various aspects of the embodiments described. For example, the various sizes of packets and/or transactions used in illustrating embodiments of the present invention are not intended to be limiting. The embodiments disclosed within this specification facilitate more efficient and accurate hardware co-simulation when a hardware implementation of a processor is involved.

The flowcharts in the figures illustrate the architecture, functionality, and operation of possible implementations of systems, methods and computer program products according to various embodiments of the present invention. In this regard, each block in the flowcharts may represent a module, segment, or portion of code, which comprises one or more portions of executable program code that implements the specified logical function(s).

It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It also should be noted that each block of the flowchart illustrations, and combinations of blocks in the flowchart illustrations, can be implemented by special purpose hardware-based systems that perform the specified functions or acts, or combinations of special purpose hardware and executable instructions.

Embodiments of the present invention can be realized in hardware or a combination of hardware and software. The embodiments can be realized in a centralized fashion in one system or in a distributed fashion where different elements are spread across several interconnected systems. Any kind of data processing system or other apparatus adapted for carrying out the methods described herein is suited.

Embodiments of the present invention further can be embedded in a device such as a computer program product, which comprises all the features enabling the implementation of the methods described herein. The device can include a data storage medium, e.g., a computer-usable or computer-readable storage medium, storing program code that, when loaded and executed in a system comprising memory and a processor, causes the system to perform the functions described herein. Examples of data storage media can include, but are not limited to, optical media, magnetic media, magneto-optical media, computer memory such as random access memory or hard disk(s), or the like.

The terms "computer program," "software," "application," "computer-usable program code," "program code," "executable code," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, program code can include, but is not limited to, a subroutine, a function, a procedure, an object method, an object implementation, an executable application, an applet, a servlet, a source code, an object code, a shared library/dynamic load library, configuration data such as a bitstream that instantiates a circuit within an IC, and/or other sequence of instructions designed for execution on a computer system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

The embodiments disclosed herein can be embodied in other forms without departing from the spirit or essential attributes thereof. Accordingly, reference should be made to the following claims, rather than to the foregoing specification, as indicating the scope of the embodiments of the present invention.

What is claimed is:

1. A system configured for hardware co-simulation involving a processor, disposed within a programmable integrated circuit (IC), and communicating with a host processing system executing a circuit simulation involving the processor, the bus proxy system comprising:
   a bus proxy comprising a primary slave disposed within the programmable IC and coupled to the processor via a bus, wherein the primary slave is configured to operate at a speed of, and is synchronized with, the bus;
   a hardware co-simulation interface disposed within the programmable IC, wherein the hardware co-simulation interface is coupled to the bus proxy and is coupled to the host processing system via a communication link, wherein the hardware co-simulation interface is configured to buffer simulation data from the bus proxy and the host processing system; and
   a secondary slave configured to execute with the host processing system at a simulation speed that is asynchronous to the speed of the bus, wherein the secondary slave is configured to read data from, and write data to, the hardware co-simulation interface over the communication link, and communicate with at least one high level modeling system (HLMS) block executing within the circuit simulation,
   wherein the primary slave is configured to exert a slave wait signal on the bus responsive to detecting a bus request from the processor specifying an address corresponding to the HLMS block within the host processing system.

2. The system of claim 1, wherein the hardware co-simulation interface further comprises:
   a write buffer configured to store bus requests detected by the primary slave;
   a read buffer configured to store responses from the secondary slave; and
   a bridge control circuit configured to coordinate access of the bus proxy and the secondary slave to the write buffer and the read buffer during hardware co-simulation.

3. The system of claim 2, wherein:
   the bus proxy further comprises a slave buffer interface configured to record the bus request occurring at the speed of the bus and encode the bus request into a format storable within a memory, and the slave buffer interface is further configured to write the encoded bus request to the write buffer.

4. The system of claim 3, wherein the hardware co-simulation interface is configured to send the encoded bus request to the secondary slave of the host processing system over the communication link, wherein, responsive to receiving the encoded bus request, the secondary slave is configured to play the encoded bus request to the HLMS block within the simulation.

5. The system of claim 4, wherein the secondary slave is configured to record a response from the HLMS block within the circuit simulation and store the response within the read buffer of the hardware co-simulation interface via the communication link.

6. The system of claim 5, wherein:

the slave buffer interface is configured to provide the response from the read buffer to the primary slave, and the primary slave is configured to de-assert the slave wait signal and play the response on the bus at the speed of the bus.

7. The system of claim 1, wherein, responsive to receiving a response from the host processing system, the bus proxy is configured to de-assert the slave wait signal and play the response over the bus at the speed of the bus.

8. A programmable integrated circuit (IC) configured to perform hardware-co-simulation, the programmable IC comprising:

a processor coupled to at least a first input/output (I/O) pin, wherein the first I/O pin is a direct I/O pin;

a plurality of shift registers coupled to at least one port of the processor, wherein the at least one port is disposed entirely within the programmable IC;

at least a second I/O pin coupled to the plurality of shift registers via programmable circuitry of the programmable IC that is exclusive of the processor, wherein the first I/O pin is coupled to the second I/O pin via a communication link external to the programmable IC; and an interface circuit coupled to the plurality of shift registers and a host processing system executing a circuit simulation involving the processor, wherein the interface circuit is configured to selectively move data from the host processing system into the processor via the plurality of shift registers and receive data generated by the processor via the plurality of shift registers.

9. The programmable IC of claim 8, wherein the processor is configured to output data from the first I/O pin to the plurality of shift registers through the communication link external to the programmable IC and the second I/O pin.

10. The programmable IC of claim 8, wherein the processor is configured to receive data sent from the host processing system through the plurality of shift registers to the second I/O pin and to the first I/O pin.

11. The programmable IC of claim 8, wherein the interface circuit, during an interactive mode, is configured to receive a single cycle transaction comprising one cycle of processor input data from the host processing system, provide the processor input data to the processor, and send one cycle of processor output data to the host processing system as a single cycle transaction.

12. The programmable IC of claim 8, wherein the interface circuit, during a replay mode, is configured to receive a multi-cycle transaction comprising a plurality of replay sequences, provide processor input data to the processor from a selected replay sequence, compare actual processor output data to expected output data of the selected replay sequence, and continue operation in replay mode or switch to interactive mode according to the comparison.

13. A method of hardware co-simulation between a programmable integrated circuit (IC) comprising a processor and a host processing system executing a circuit simulation involving the processor, the method comprising:

when in a replay mode, receiving, from the host processing system, a multi-cycle transaction comprising a first plurality of replay sequences, wherein each replay sequence comprises processor input data and expected processor output data for one cycle of operation of the processor;

while in replay mode and within the programmable IC, providing processor input data of a selected replay sequence to the processor and comparing actual processor output data with the expected processor output data from the selected replay sequence; and selectively exiting replay mode according to the comparison of the actual processor output data with the expected processor output data.

14. The method of claim 13, further comprising, when the actual output data matches the expected output data for each replay sequence of the first plurality of replay sequences, remaining in replay mode and requesting a further multi-cycle transaction comprising a second plurality of replay sequences.

15. The method of claim 13, further comprising, responsive to detecting a mode change condition when in replay mode, entering an interactive mode and requesting the host processing system send a single cycle transaction comprising processor input data for a single cycle of operation without expected processor output data.

16. The method of claim 15, further comprising selecting the mode change condition to be determining that the actual processor output data does not match the expected processor output data from the selected replay sequence.

17. The method of claim 15, further comprising selecting the mode change condition to be executing a selected instruction within a program executing within the processor within the programmable IC.

18. The method of claim 15, wherein the programmable IC is operating in interactive mode within the host processing system, the method further comprising, responsive to detecting a further mode change condition:

signaling the programmable IC to enter replay mode;

selecting a predetermined number of replay sequences from a plurality of prior saved replay sequences from a prior hardware co-simulation involving the processor; and sending the selected replay sequences from the host processing system to the programmable IC within a single transaction.

19. The method of claim 18, further comprising selecting the further mode change condition to be identifying a correlation between the actual processor output data for at least one cycle of operation of the processor and processor output data of at least one prior saved replay sequence from a prior hardware co-simulation involving the processor.

20. The method of claim 19, wherein the identifying comprises identifying the correlation when at least one header of the actual processor output data matches at least one header of the processor output data saved from the prior hardware co-simulation.

* * * * *